United States Patent Office 2,762,743
Patented Sept. 11, 1956

2,762,743

1-PHENYL-3(3-AS-TRIAZINYL) UREA COMPOSITIONS FOR THE TREATMENT OF COCCIDIOSIS AND METHOD FOR PREPARING THE SAME

Arthur J. Basso, Rahway, N. J., and Robert C. O'Neill, New York, N. Y., assignors to Merck & Co., Inc., Rahway, N. J., a corporation of New Jersey No Drawing. Application March 11, 1953, Serial No. 341,822

16 Claims. (Cl. 167—53.1)

This invention relates to urea derivatives. More particularly, it is concerned with the production of novel 1-phenyl-3(3-as-triazinyl) ureas and therapeutic compositions containing the same.

One object of the present invention is to provide new derivatives of phenylureas. Another object is to provide novel 1-phenyl-3-heterocyclic ureas which have valuable chemotherapeutic properties. A further object is to provide 1-phenyl-3(3-as-triazinyl) ureas which are useful against coccidiosis. An additional object is the preparation of compositions useful against coccidiosis containing such compounds as the active ingredient. It is also an object to provide methods for the preparation of 1-phenyl-3-heterocyclic ureas. Other objects will be apparent from the detailed description hereinafter provided.

According to one embodiment of the present invention novel 1-phenyl-3(3-as-triazinyl) ureas are provided having the formula

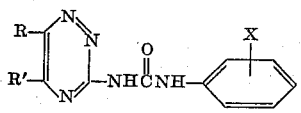

wherein R and R' represent hydrogen, hydroxy, alkyl and aryl groups or groups wherein R and R' are joined to form part of an aryl or cycloalkyl ring, and X represents a hydrogen, nitro, halo, cyano, alkyl, or alkoxy group. These 1-phenyl-3-(3-as-triazinyl) ureas are produced by reacting a 3-amino-as-triazine with a phenylisocyanate according to the following reaction:

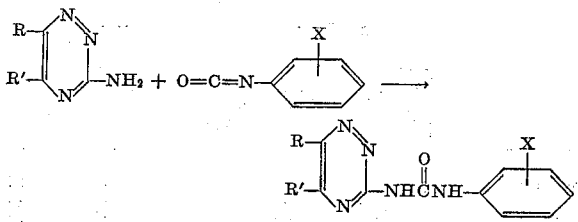

wherein R, and R', and X have the significance previously assigned.

The 3-amino-as-triazines used as starting materials are conveniently prepared by reacting glyoxal, alkylglyoxal, arylglyoxal, and 1,2-diketones such as 1,2-dialkyldiones and 1,2-diaryldiones with aminoguanidine in a suitable solvent. The reaction proceeds readily at room or elevated temperatures up to about 60° C. After the reaction is completed the resulting insoluble triazines may be easily recovered from the reaction mixture by conventional methods, such as filtration. In this manner 3-amino-as-triazine and derivatives thereof having substituents at the 5 and/or 6 positions are prepared by reacting the corresponding 1,2-dicarbonyl compound with aminoguanidine. Examples of triazines prepared according to this method are 3-amino-5(6)-methyl-as-triazine, 3-amino-5(6)-butyl-as-triazine, 3-amino-5,6-dimethyl-as-triazine, 3-amino-5,6-diethyl-as-triazine, 3-amino-5(6)-methyl-6(5)-ethyl-as-triazine and 3-amino-5,6,7,8-tetrahydro-1,2,4-benzotriazine. When unsymmetrical 1,2-dicarbonyls such as alkyl glyoxals or 1,2-diketones having dissimilar substituents are reacted with aminoguanidine according to this process, the resulting 3-amino-as-triazine may be substituted in the 5 and/or 6 position with either one or both of the available substituents. It is therefore possible to obtain a single product or a mixture of isomeric or homologous triazines. To show that a particular substituent may be in either the 5 and/or 6 position the other possible position has been indicated in parentheses. Additional information concerning the preparation of these and similar triazines is disclosed in the copending application Serial No. 341,818, filed March 11, 1953, and now abandoned.

The phenylisocyanate and derivatives thereof containing nuclear nitro, halo, cyano, alkyl and alkoxy substituents used as starting materials in this invention may be obtained from commercial sources or prepared by methods known in the art. One such method comprises reacting aniline, or a nuclear substituted aniline, with phosgene to produce the corresponding phenylisocyanate. Thus, 4-cyanophenylisocyanate is prepared by subjecting 4-cyanoaniline to the action of phosgene. Other representative nuclear substituted phenylisocyanates which can be prepared according to this reaction are 4-nitrophenylisocyanate, 4-chlorophenylisocyanate, 4-methylphenylisocyanate, 4-ethylphenylisocyanate, 4-methoxyphenylisocyanate, and nuclear position isomers thereof such as 2-nitrophenylisocyanate, 3-chlorophenylisocyanate, 3-methylphenylisocyanate and the like.

The desired 1-phenyl-3(3-as-triazinyl) ureas of this invention are conveniently produced by intimately contacting an appropriate triazine with an appropriate isocyanate in a neutral inert organic solvent. Solvents substantially free of water and particularly anhydrous solvents are preferred for production of highest yields of the desired compounds. Examples of suitable solvents which can be used are carbon tetrachloride, chloroform, ethylene dichloride, benzene, toluene, xylene, ethyl ether, and dioxane. Such solvents are commercially available and easily dried.

Temperatures suitable to effect the condensation will vary with the reactants. However, room temperature and elevated temperatures up to about 100° C. and somewhat higher have been found effective. After the reactants have been combined the reaction goes to completion in a short time, generally in a matter of minutes. Since the 1-phenyl-3-(3-as-triazinyl) ureas are relatively insoluble in nearly all solvents, the product precipitates from the reaction mixture and is easily recovered by ordinary means, such as filtration. Some of the novel compounds which can be produced according to this condensation process are 1-phenyl-3-(3-as-triazinyl) urea, 1-(4-nitrophenyl)-3-(3-as-triazinyl) urea, 1-(4-cyanophenyl)-3-(3-as-triazinyl) urea, 1-(4-chlorophenyl)-3-(3-as-triazinyl) urea, 1-(4-methylphenyl)-3-(3-as-triazinyl) urea, 1(4-ethylphenyl)-3-(3-as-triazinyl) urea, 1-(4-butylphenyl)-3-(3-as-triazinyl) urea, 1-(4-ethoxyphenyl)-3-(3-as-triazinyl) urea, 1-(4-nitrophenyl)-3-(3-[5(6)methyl-as-triazinyl]) urea, 1-(4-nitrophenyl)-3-[3-(5,6-dimethyl-as-triazinyl)] urea, 1-(4-nitrophenyl)-3-[3-(5,6,7,8-tetrahydro-1,2,4-benzotriazinyl)] urea, 1-phenyl-3-[3-(5,6-dimethyl-as-triazinyl)] urea, 1-(4-nitrophenyl)-3-[3-(5,6-diphenyl-as-triazinyl)] urea, 1-(2-methylphenyl)-3-(3-as-triazinyl) urea, 1-(3-chlorophenyl) - 3 - (3 - as-triazinyl) urea, 1-(3-nitrophenyl)-3-(3-as-triazinyl) urea, 1-(4-cyanophenyl)-3-(3-as-triazinyl) urea, 1-(4-ethoxyphenyl)-3-(3-as-triazinyl) urea, and 1-(4-aminophenyl)-3-(3-as-triazinyl) urea, and the like.

In a further embodiment of this invention novel compounds are provided having the formula

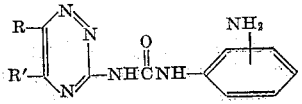

wherein R and R' represent hydrogen, hydroxy, alkyl and aryl groups or groups wherein R and R' are joined to form part of an aryl or cycloalkyl ring. Such compounds are produced by reacting the corresponding nitrophenyl precursor with a suitable reducing agent. Examples of reducing agents useful for this purpose are ammonium sulfide, tin and hydrochloric acid, and hydrogen in the presence of platinum or palladium catalysts. Although inert organic solvents may be used as the reaction medium it is preferred to effect the reduction by suspending the nitro compound in a dilute acid, such as dilute hydrochloric acid or acetic acid. The resulting amine is obtained in the acidic solution as an acid addition salt. By neutralizing the reaction mixture the free amine is produced and immediately precipitates from solution. It may then be recovered by conventional methods such as filtration. Examples of amino derivatives which are prepared by this process are 1-(4-aminophenyl)-3-(3-as-triazinyl) urea, 1-(4-aminophenyl)-3-(3-[5(6) methyl-as-triazinyl]) urea, 1-(4-aminophenyl) - 3-[3 - (5,6-dimethyl-as-triazinyl)] urea, 1 - (4 - aminophenyl) - 3 - [3 - (5,6,7,8-tetrahydro-1,2,4-benzotriazinyl)] urea and the like.

The 1-phenyl-3-(3-as-triazinyl) ureas have activity against a number of prevalent diseases including malaria and schistosomiasis. However, these compounds are especially active against the widespread disease complex in poultry commonly called "coccidiosis" caused by species of protozoan parasites of the genus Eimeria. In this regard, E. tenella is responsible for a severe and frequently fatal infection of the cecum of chickens. Furthermore, other serious infections are caused in fowl by other species of Eimeria and especially E. acervulina, E. necatrix, E. maxima, and E. brunetti. If left untreated, such infections often cause extensive losses of fowl regardless of geographical location. Obviously the elimination or control of coccidiosis is of the utmost importance for successful poultry raising.

Therefore, according to a further embodiment of this invention, novel compositions useful in the treatment of coccidiosis are provided containing a 1-phenyl-3-(3-as-triazinyl) urea as the active ingredient. These compositions comprise a 1-phenyl-3-(3-as-triazinyl) urea intimately combined with an inert carrier. In this regard, compositions which contain a compound of the formula

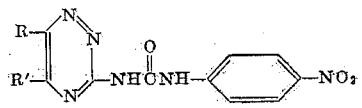

wherein R and R' represent hydrogen, hydroxy, alkyl and aryl groups or groups wherein R and R' are joined to form part of an aryl or cycloalkyl ring, as the active ingredient have been found to be particularly useful against coccidiosis.

The compositions of this invention comprise at least one 1-phenyl-3-(3-as-triazinyl) urea combined with an inert carrier or diluent. Such compositions are conveniently produced by intimately dispersing the active ingredient throughout a carrier. The carrier or diluent may be either liquid or solid. Although the active compounds are essentially insoluble in most liquids, satisfactory dispersions can be prepared by using emulsifiers and surface active agents. Any solid can be used as a carrier which is inert toward the active compounds and which can be administered to animals safely. Examples of suitable carriers are ground oyster shells, Attapulgus clay and edible vegetable materials such as commercial animal and poultry feeds, and distillers' dried grains. The active ingredient is conveniently dispersed in a solid carrier by conventional methods such as stirring, tumbling, and grinding. In this manner, by selecting different carriers and by altering the ratio of carrier to active ingredient, compositions of varying concentrations and properties can be prepared.

The amount of drug required for effective control of coccidiosis is very low. With regard to poultry, optimum results are usually obtained by the daily administration of a quantity of drug equal to 0.025% to 0.1% of the food consumed. Such relatively small amounts may be conveniently incorporated in the normal ration prior to feeding the poultry. However, larger concentrations of drug may be used if an especially virulent outbreak of the disease is encountered.

The coccidiostatic activity of compositions containing representative 1-phenyl-3(3-as-triazinyl) ureas was experimentally demonstrated according to the following test:

Groups of 10 two-week old chicks were fed a mash feed containing from 0.0125% to 0.1% of the drug uniformly dispersed therein. After existing on the diet for 24 hours, each chick was inoculated with 50,000 oocysts of E. tenella. In addition, groups of 10 chicks were also infected but fed a drug-free diet and used as positive controls. Other groups were infected but administered sulfaquinoxaline as a standard control. The experiment was terminated after adminstering the respective diets for 8 days and the following results were obtained:

|  | Treated Infected Chicks | | | Untreated Infected Chicks | |
| --- | --- | --- | --- | --- | --- |
|  | Percent of Drug in Diet | Percent Mortality | Percent Weight Gain | Percent Mortality | Percent Weight Gain |
| 1-(4-nitrophenyl)-3-(3-as-triazinyl) urea. | 0.1 | 0 | 66 | 50 | 28 |
|  | 0.05 | 0 | 61 | 50 | 30 |
|  | 0.025 | 20 | 54 | 50 | 28 |
| 1-(4-nitrophenyl)-3-[3-[5(6)-methyl-as-triazinyl]]urea. | 0.1 | 0 | 64 | 40 | 43 |
| 1-(4-nitrophenyl)-3-[3-[5,6-dimethyl-as-triazinyl)]]urea. | 0.1 | 0 | 64 | 40 | 43 |
| 1-(4-nitrophenyl)-3-[3-(5,6,7,8-tetrahydro-1,2,4-benzo-triazinyl)] urea. | 0.1 | 0 |  | 20 |  |
| Sulfaquinoxaline | 0.1 | 0 | 65 |  |  |
|  | 0.05 | 0 | 56 |  |  |
|  | 0.025 | 20 | 45 |  |  |

These results clearly indicate that 1-phenyl-3-(3-as-triazinyl) ureas are capable of preventing or substantially reducing deaths due to coccidiosis in poultry while maintaining a very high rate of growth.

Compositions useful in the treatment of coccidiosis may also be prepared containing in addition to at least one active 1-phenyl-3-(3-as-triazinyl) urea combined with a suitable carrier, other coccidiostats which are presently available such as sulfaquinoxaline, 3,3-dinitrodiphenyldisulfide, arsenicals, and combinations of the ordinary therapeutically useful sulfa drugs. One such composition suitable for use in the control of coccidiosis in poultry comprises 0.05% 1-(4-nitrophenyl) - 3 - (3-as-triazinyl) urea and 0.05% of sulfaquinoxaline combined with a feedstuff.

The following examples illustrate specific methods of producing the novel 1-phenyl-3-(3-as-triazinyl) ureas of this invention.

EXAMPLE 1

*Production of 1-(3-nitrophenyl)-3-(3-as-triazinyl) urea*

To a solution of 18.0 gm. of 3-nitrophenylisocyanate in 100 ml. of warm dry dioxane was added a solution of 9.7 gm. of 3-amino-as-triazine in 150 ml. of warm dry dioxane. Within a few minutes crystals of 1-(3-nitrophenyl)-3-(3-as-triazinyl) urea deposited from solution. After standing at room temperature for two hours the reaction mixture was filtered and the product washed with dioxane. The product melted at 225–231° C.

EXAMPLE 2

*Production of 1-(4-nitrophenyl)-3-(3-as-triazinyl) urea*

To 100 ml. of dry dioxane was added 16.4 gm. of 4-nitrophenylisocyanate and the mixture filtered. It was warmed to 45° C. and to it was added a solution of 10 gm. of 3-amino-as-triazine in 90 ml. of dry dioxane. The product began to precipitate in a few minutes. After standing at 40–45° C. for ninety minutes the reaction mixture was warmed to 60° C. for 30 minutes. It was then cooled and filtered to obtain the greenish-yellow 1-(4-nitrophenyl)-3-(3-as-triazinyl) urea. The product sinters at 250° C. and decomposes about 265° C.–270° C. It is insoluble in cold and boiling water, dioxane, ethanol, ether, and pyridine.

EXAMPLE 3

*Production of 1-(4-nitrophenyl)-3-(3-as-triazinyl) urea*

To a solution of 12.5 gm. of 4-nitrophenylisocyanate in 125 ml. of boiling anhydrous toluene was added 7.3 gm. of solid 3-amino-as-triazine. The mixture was refluxed for 30 minutes with rapid stirring. It was then cooled to 25° C. and the desired 1-(4-nitrophenyl)-3-(3-as-triazinyl) urea isolated by filtration. The product was washed with toluene, ether, and air dried at 50° C.

EXAMPLE 4

*Production of 1-(4-chlorophenyl)-3-(3-as-triazinyl) urea*

A solution of 9.71 gm. of 3-amino-as-triazine in 100 ml. of boiling dry dioxane was added to a filtered solution of 15.35 gm. of 4-chlorophenylisocyanate in 15 ml. of dry dioxane. The mixture was refluxed for 2 hours and then allowed to cool slowly during which time the 1-(4-chlorophenyl)-3-(3-as-triazinyl) urea crystallized from solution. The product was isolated by filtration and recrystallized from dioxane. It had a melting point of 218–220° C.

EXAMPLE 5

*Production of 1-(4-cyanophenyl)-3-(3-as-triazinyl) urea*

To a suspension of 7.8 gm. of 3-amino-as-triazine in 250 ml. of dry toluene was added 11.5 gm. of 4-cyanophenylisocyanate at room temperature. The mixture was refluxed for about 2 hours, chilled to room temperature and filtered. The desired 1-(4-cyanophenyl)-3-(3-as-triazinyl) urea was washed with toluene, ethanol and water. After drying, the product melted at 247–251° C.

EXAMPLE 6

*Production of 1-(4-ethoxyphenyl)-3-(3-as-triazinyl) urea*

To a suspension of 9.71 gm. of 3-amino-as-triazine in 250 ml. of toluene was added 16.4 gm. of 4-ethoxyphenylisocyanate at room temperature. The mixture was heated at reflux for one and one-half hours and allowed to stand overnight at room temperature. 1-(4-ethoxyphenyl)-3-(3-as-triazinyl) urea crystallized from solution and was recovered by filtration. The product was washed with dry toluene, benzene, ether and dried; melting point 196–197.5° C.

EXAMPLE 7

*Production of 1-phenyl-3-[3-(5,6-dimethyl-as-triazinyl)] urea*

To 250 ml. of dry toluene was added 12.5 gm. of 3-amino-5,6-dimethyl-as-triazine and 13 gm. of phenylisocyanate. The mixture was heated at reflux for 1 hour and 15 minutes. The reaction mixture was cooled slowly to room temperature during which time the 1-phenyl-3-[3-(5,6-dimethyl-as-triazinyl)] urea crystallized from solution. The product was recovered by filtration, washed with dry toluene, ether, and air-dried. It melted at 200–201° C.

EXAMPLE 8

*Production of 1-(4-nitrophenyl)-3-[3-(5,6-dimethyl-as-triazinyl)] urea*

A solution of 14.6 gm. of 3-amino-5,6-dimethyl-as-triazine in 205 ml. of anhydrous boiling dioxane was added with stirring to a filtered solution of 19.2 gm. of 4-nitrophenylisocyanate in 120 ml. of dry dioxane. Bright greenish yellow 1-(4-nitrophenyl)-3-[3-(5,6-dimethyl-as-triazinyl)] urea began to crystallize in a few minutes. The reaction mixture was boiled for 5 minutes and allowed to cool slowly to room temperature. The product was recovered by filtration under diminished pressure, washed with dioxane, ether, and then dried. It had a melting point of 254–255° C.

EXAMPLE 9

*Production of 1-(4-nitrophenyl)-3-{3-[5(6)-methyl-as-triazinyl]} urea*

A solution of 4 gm. of 3-amino-5(6)-methyl-as-triazine in 100 ml. of hot anhydrous dioxane was added with stirring to a solution of 5.9 gm. of 4-nitrophenylisocyanate in 40 ml. of dioxane. Bright yellow crystals of 1-(4-nitrophenyl)-{3-(3-[5(6)-methyl-as-triazinyl])} urea formed in a few minutes. The product was isolated by filtration, washed with dioxane, then ether, and dried. It decomposed at 254–256° C.

EXAMPLE 10

*Production of 1-(4-nitrophenyl)-3-[3-(5,6,7,8-tetrahydrobenzo-as-triazinyl)] urea*

To a solution of 5.0 gm. of 3-amino-5,6,7,8-tetrahydrobenzo-as-triazine in 75 ml. of boiling dry dioxane was added a filtered solution of 5.46 gm. of 4-nitrophenylisocyanate in 15 ml. of warm dry dioxane. The mixture was stirred for two minutes during which greenish-yellow crystals of 1-(4-nitrophenyl)-3-[3-(5,6,7,8-tetrahydrobenzo-as-triazinyl)] urea began to deposit. After standing for one hour the product was collected by filtration, washed with dry dioxane, and then ether. It melted at 241–243° C.

EXAMPLE 11

*Production of 1-(4-aminophenyl)-3-(3-as-triazinyl) urea*

To a solution of 2.6 gm. of 1-(4-nitrophenyl)-3-(3-as-triazinyl) urea in 100 ml. of 2.5 N HCl was added 0.5 gm. of palladium on charcoal. The mixture was then hydrogenated at room temperature and about 40 pounds per square inch pressure to form 1-(4-aminophenyl)-3-(3-as-triazinyl) urea. The mixture was filtered and poured into an excess of ammonium hydroxide. The desired compound precipitated and was recovered by filtration. The cake was washed with water, ethanol, ether and dried. After recrystallization from acetic acid the 1-(4-aminophenyl)-3-(3-as-triazinyl) urea darkened at 185° C. and sintered up to 285° C.

Various changes and modifications in the procedures

What is claimed is:

1. A compound of the formula

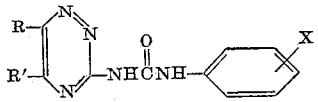

wherein R and R' represent members selected from the class consisting of hydrogen, hydroxy, lower alkyl, and monocyclic aryl groups and groups wherein R and R' are joined to form part of monocyclic aryl and cycloalkyl groups, and X represents a member selected from the group consisting of hydrogen, nitro, halo, amino, cyano, lower alkyl and lower alkoxy radicals.

2. 1-(4-nitrophenyl)-3-(3-as-triazinyl) urea.
3. 1-(4-nitrophenyl)-3-[3-(5,6-dimethyl-as-triazinyl)] urea.
4. 1-(3-nitrophenyl)-3-(3-as-triazinyl) urea.
5. 1-(4-cyanophenyl)-3-(3-as-triazinyl) urea.
6. 1-(4-aminophenyl)-3-(3-as-triazinyl) urea.
7. The process for producing compounds of the formula:

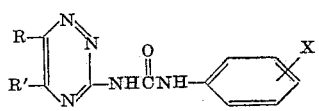

which comprises reacting a 3-amino-as-triazine of the formula:

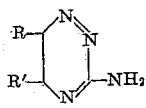

with an isocyanate of the formula:

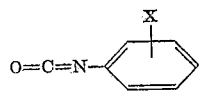

in each occurrence R and R' representing members selected from the class consisting of hydrogen, hydroxy, lower alkyl and monocyclic aryl groups and groups wherein R and R' are joined to form part of monocyclic aryl and cycloalkyl groups, and X represents a member selected from the group consisting of hydrogen, nitro, halo, cyano, lower alkyl and lower alkoxy radicals.

8. The process for producing 1-(4-nitrophenyl)-3-(3-as-triazinyl) urea which comprises reacting 3-amino-as-triazine with 4-nitrophenylisocyanate.

9. The process for producing 1-(4-nitrophenyl)-3-[3-(5,6-dimethyl-as-triazinyl)] urea which comprises reacting 3-amino-5,6-dimethyl-as-triazine with 4-nitrophenyl-isocyanate.

10. The process for producing a compound of the formula

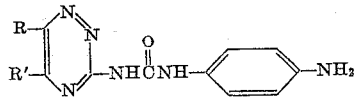

which comprises subjecting the corresponding 4-nitrophenyl compound to the action of a reducing agent, R and R' representing members selected from the class consisting of hydrogen, hydroxy, lower alkyl, and monocyclic aryl groups and groups wherein R and R' are joined to form part of monocycloc aryl and cycloalkyl groups.

11. A composition useful against coccidiosis which comprises a compound of the formula

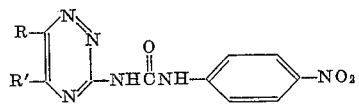

and an inert carrier, R and R' representing members selected from the class consisting of hydrogen, hydroxy, lower alkyl, and monocyclic aryl groups and groups wherein R and R' are joined to form part of monocyclic aryl and cycloalkyl groups.

12. A composition according to claim 11 in which the carrier is an inert solid.

13. A composition according to claim 11 in which the carrier is an animal feedstuff.

14. A composition useful against coccidiosis which which comprises 1-(4-nitrophenyl)-3-(3-as-triazinyl) urea intimately dispersed in an animal feedstuff.

15. A composition useful against coccidiosis which comprises 1-(4-nitrophenyl)-3-[3-(5,6-dimethyl-as-triazinyl)] urea intimately dispersed in an animal feedstuff.

16. A composition useful against coccidiosis which comprises a compound of the formula

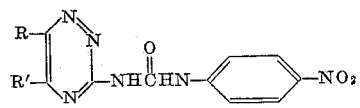

sulfaquinoxaline, and an inert carrier, R and R' representing members selected from the class consisting of hydrogen, hydroxy, lower alkyl, and monocyclic aryl groups and groups wherein R and R' are joined to form part of monocyclic aryl and cycloalkyl groups.

No references cited.